:::::

United States Patent
Xiao et al.

(10) Patent No.: US 9,725,653 B2
(45) Date of Patent: Aug. 8, 2017

(54) DEVICE AND METHOD FOR PREPARING OXYGEN-CONTAINING LIQUID FUEL BY BIO-OIL CATALYTIC CONVERSION

(71) Applicant: SOUTHEAST UNIVERSITY, Jiangsu (CN)

(72) Inventors: Rui Xiao, Jiangsu (CN); Huiyan Zhang, Jiangsu (CN); Yong Zhang, Jiangsu (CN); Dekui Shen, Jiangsu (CN)

(73) Assignee: SOUTHEAST UNIVERSITY, Nanjing (CN)

( * ) Notice: Subject to any disclaimer, the term of this patent is extended or adjusted under 35 U.S.C. 154(b) by 214 days.

(21) Appl. No.: 14/381,573

(22) PCT Filed: Dec. 5, 2012

(86) PCT No.: PCT/CN2012/085920
§ 371 (c)(1),
(2) Date: Aug. 27, 2014

(87) PCT Pub. No.: WO2013/127215
PCT Pub. Date: Sep. 6, 2013

(65) Prior Publication Data
US 2015/0099908 A1    Apr. 9, 2015

(30) Foreign Application Priority Data

Feb. 29, 2012   (CN) .......................... 2012 1 0048810

(51) Int. Cl.
*C10G 1/00*      (2006.01)
*C10L 1/02*      (2006.01)
(Continued)

(52) U.S. Cl.
CPC .............. *C10G 1/002* (2013.01); *B01J 8/005* (2013.01); *B01J 8/12* (2013.01); *B01J 8/22* (2013.01);
(Continued)

(58) Field of Classification Search
CPC ..................................................... C10G 1/002
(Continued)

(56) References Cited

U.S. PATENT DOCUMENTS 4,361,495 A  *  11/1982  Hort .......................... B01J 23/94
                                                               502/53
5,904,838 A  *   5/1999  Kalnes ..................... C10G 65/04
                                                              208/143
(Continued)

FOREIGN PATENT DOCUMENTS

CN         101475143 A1    7/2009
CN         102277188 A    12/2011
(Continued)

OTHER PUBLICATIONS

Yi, W.; Bai, X.; Li, Z.; Wang, L.; Wang, N.; Yang, Y. "Laboratory and pilot scale studies on fast pyrolysis of corn stover", Int. J. Agric. & Biol. Eng. (2008), 1, pp. 57-63.*
(Continued)

*Primary Examiner* — In Suk Bullock
*Assistant Examiner* — Aaron Pierpont
(74) *Attorney, Agent, or Firm* — Gokalp Bayramoglu

(57) ABSTRACT

Devices and methods for preparing oxygen-containing liquid fuel by bio-oil catalytic conversion. A device includes a biomass fast thermal cracking system for preparing bio-oil, a bio-oil oil-water separating system for separating the bio-oil into oil phase bio-oil and water phase bio-oil that is output to an oil phase bio-oil chemical chain hydrogen production system, and a water phase bio-oil catalytic (Continued)

hydrogenation system. The hydrogen production system outputs produced hydrogen to the water phase bio-oil catalytic hydrogenation system to prepare a liquid fuel. A method includes the steps: thermally cracking the biomass to prepare bio-oil, separating the water phase and the oil phase, producing hydrogen from the oil phase bio-oil through a chemical chain method so as to provide a hydrogen source for the water phase bio-oil to carry out two-stage catalytic hydrogenation in a slurry bed, and separating and purifying the hydrogenated products to obtain an oxygen-containing liquid fuel.

6 Claims, 1 Drawing Sheet

(51) Int. Cl.
C10B 49/22 (2006.01)
C10B 53/02 (2006.01)
C10C 5/00 (2006.01)
B01J 19/24 (2006.01)
C10G 3/00 (2006.01)
B01J 8/12 (2006.01)
B01J 8/22 (2006.01)
B01J 8/00 (2006.01)

(52) U.S. Cl.
CPC ............. *B01J 19/245* (2013.01); *C10B 49/22* (2013.01); *C10B 53/02* (2013.01); *C10C 5/00* (2013.01); *C10G 3/45* (2013.01); *C10G 3/49* (2013.01); *C10G 3/52* (2013.01); *C10L 1/02* (2013.01); *B01J 2208/00513* (2013.01); *B01J 2219/0004* (2013.01); *B01J 2219/00006* (2013.01); *B01J 2219/24* (2013.01); *C10G 2300/708* (2013.01); *C10L 2200/0469* (2013.01); *C10L 2290/543* (2013.01); *Y02E 50/14* (2013.01); *Y02E 60/36* (2013.01); *Y02P 20/145* (2015.11); *Y02P 30/20* (2015.11)

(58) Field of Classification Search
USPC .................................................. 585/240, 250
See application file for complete search history.

(56) References Cited

U.S. PATENT DOCUMENTS 6,080,372 A * 6/2000 Machado ................. B01J 8/006
422/140
2011/0139597 A1 6/2011 Lin
2011/0245554 A1* 10/2011 Huber .................... B01J 23/002
585/251

FOREIGN PATENT DOCUMENTS

CN 102653691 A 9/2012
CN 202543163 U 11/2012
WO WO 2008057263 A2 * 5/2008 ............. C07C 29/00

OTHER PUBLICATIONS

Salehi, E.; Seyedeyn, A.; Harding, T.; Abedi, J. "Production of hydrogen by steam reforming of bio-oil over Ni/Al2O3 catalysts: Effect of addition of promoter and preparation procedure", Fuel Processing Technologyology, 92 (2011), pp. 2203-2210.*

* cited by examiner

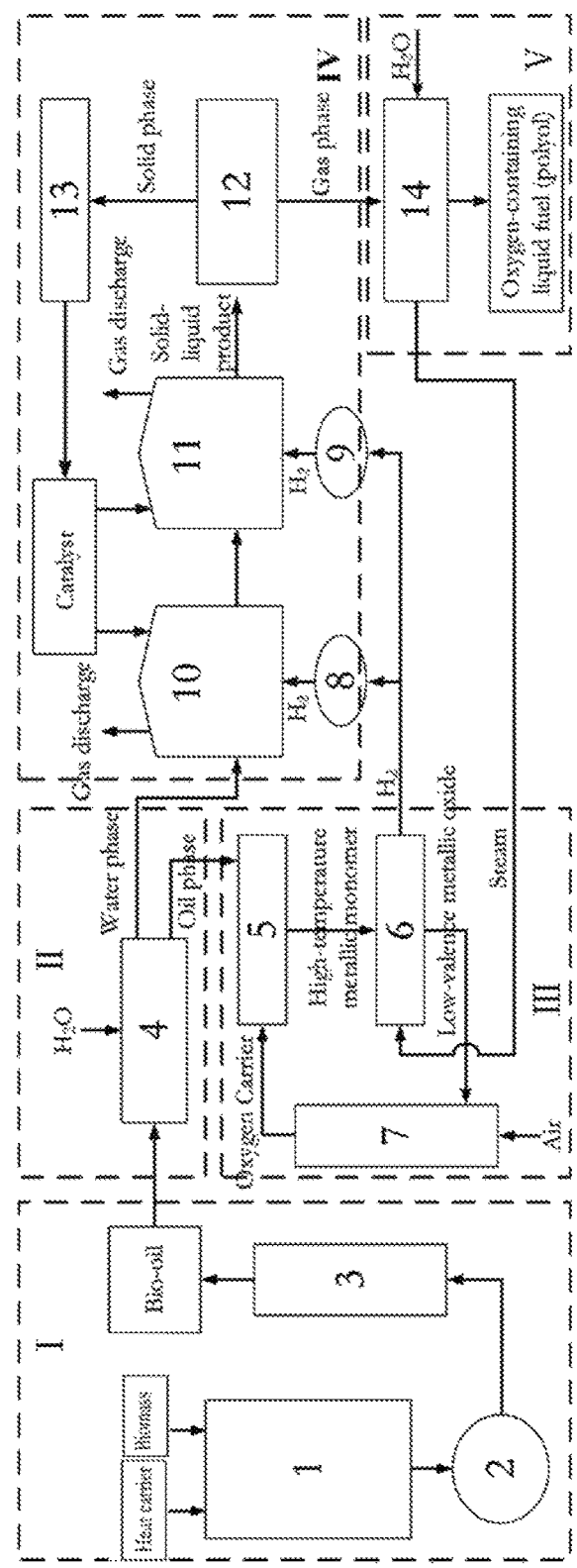

DEVICE AND METHOD FOR PREPARING OXYGEN-CONTAINING LIQUID FUEL BY BIO-OIL CATALYTIC CONVERSION

PRIORITY CLAIM

The present application is a National Phase entry of PCT Application No. PCT/CN2012/085920, filed Dec. 5, 2012, which claims priority to Chinese Patent Application No. 201210048810.5, filed Feb. 29, 2012, the disclosures of which are hereby incorporated by reference herein in their entirety.

FIELD OF THE INVENTION

The prevent invention discloses a method and device for preparing oxygen-containing liquid fuel by catalytic conversion of bio-oil and relates to the field of biomass resource utilization.

BACKGROUND OF THE INVENTION

Biomass energy is the only "multifunctional" renewable energy which can be converted into gas, solid and liquid fuels and realize complete substitution of fossil energy. Developing with priority alternative petroleum-based liquid fuel and biomass-based high-end products of chemicals (oxygen-containing liquid fuel and high-value chemicals) helps to fundamentally solve the oil shortage of China, protect national energy security and meet the requirements of China's major national development strategies. At present, the mainstream technologies for convening biomass into liquid fuel include a biochemical conversion method and a thermochemical conversion method, wherein, biomass pyrolysis liquefaction technology is one of the biomass utilization technologies with the largest development potential in the thermochemical conversion method.

Compared with biomass raw materials, biomass pyrolysis liquefaction product bio-oil has significant advantages, such as high energy density, easy storage and easy transport. Bio-oil can be directly applied in industrial boilers, gas turbines and other equipment. Refined bio-oil can be used as a substitute for automobile fuel. However, the oxygen content in bio-oil is as high as 30-40 percentage by weight (wt %) (the oxygen content in heavy oil is about 1 wt % in general) and its higher calorific value is 16-19 MJ/kg, less than a half of that of petroleum. Further, due to the existence of a large amount of unstable oxygen-containing compounds, oil will undergo polymerization and decomposition reactions when it is heated to 80° C., so the application scope of oil is greatly limited. Generally speaking, in order to improve its use value, bio-oil must be refined.

Bio-oil quality improvement processes mainly include physical methods and thermochemical methods (catalytic methods). The physical methods include emulsification methods and refining fractionation methods, which may realize effective separation and application of organic components of bio-oil, but do not fundamentally change the shortcomings of bio-oil, including high oxygen content, low calorific value and poor thermal stability. Thermochemical (catalytic) methods mainly include bio-oil catalytic cracking methods and bio-oil catalytic hydrogenation methods. Catalytic cracking may realize deoxygenation of bio-oil and improve the calorific value of bio-oil so as to obtain high-quality liquid fuel and chemicals. The catalytic hydrogenation method of bio-oil may partially deoxidize bio-oil, saturate unsaturated bonds, improve the ratio of polyalcohol and other target products in the liquid product, realize a high carbon conversion rate, improve the overall quality of bio-oil and obtain high-quality biomass-based liquid fuel and high-value platform chemical compounds. American professor Douglas Elliott, an expert in the field of bio-oil quality improvement even pointed out that the bio-oil catalytic hydrogenation process will become an important direction for upgrading bio-oil into "high-quality liquid fuel and chemicals". It is noteworthy that most of the present methods for upgrading bio-oil quality by thermochemical catalysis (catalytic hydrogenation and catalytic cracking) are directed to all-components of bio-oil (water phase and water insoluble phase or oil phase). Plentiful research has proven that the oil phase (water insoluble phase) of bio-oil is mainly composed of lignin derivatives as well as some oxygen-containing heterocyclic organic matters, and thus has poor thermal stability. During conversion, it is highly likely to cause catalyst coking and loss of catalysis, impairing process stability and continuity. Some methods are for thermochemical catalytic conversion and upgrading exclusively for the water phase or oil phase of bio-oil and do not realize utilization of all-components of bio-oil.

Therefore, conducting "staged conversion" of bio-oil by combining thermochemical catalytic method with other new methods based on the physical and chemical properties of different components (water phase and oil phase) of bio-oil to alleviate catalyst coking and enhance process continuity and stability is the only way to realize high-value, large-scale utilization of bio-oil. The demand is urgent.

SUMMARY OF THE INVENTION

Technical Problem

For the purpose of solving the problem of the catalyst coking, loss of catalysis, and impairment of process stability and continuity during upgrading of bio-oil quality by thermochemical catalytic method for all-components of bio-oil, and the problem of separate thermochemical conversion and upgrading of water phase or oil phase of bio-oil rather than utilization of all-components of bio-oil, the present invention provides a method and device for preparing oxygen-containing liquid fuel by catalytic conversion of bio-oil to realize staged utilization and hydrogen source complementation of the oil phase (non-water soluble phase, hereinafter referred to as "oil phase") bio-oil and water phase bio-oil, i.e., a device and method for preparing oxygen-containing liquid fuel by catalytic conversion of bio-oil.

Technical Solution

In order to solve the above technical problem, the present invention provides a device for preparing oxygen-containing liquid fuel by catalytic conversion of bio-oil. The device comprises a system for oil preparation by fast thermal cracking of biomass, for preparing bio-oil:

A bio-oil oil-water separation system, for receiving the foregoing bio-oil, separating the bio-oil into oil-phase bio-oil and water-phase bio-oil and delivering them to an oil-phase bio-oil chemical chain hydrogen production system and a water-phase bio-oil catalytic hydrogenation system respectively.

An oil-phase bio-oil chemical chain hydrogen production system, for receiving the foregoing oil-phase bio-oil, turning it into hydrogen and low-valence metallic oxides, and delivering hydrogen to a water-phase bio-oil catalytic hydrogenation system.

A water-phase bio-oil catalytic hydrogenation system, for receiving the foregoing water-phase bio-oil and hydrogen and taking low-temperature catalytic hydrogenation reaction with a catalyst to generate hydrogenated gas-phase product.

An oxygen-containing liquid fuel fractionation and purification system, for receiving the foregoing gas-phase product and converting it into oxygen-containing liquid fuel, meanwhile, the cooling water absorbs heat to become steam and is sent to the oil-phase bio-oil chemical chain hydrogen production system.

The system for oil preparation by fast thermal cracking of biomass may also comprise a fast thermal cracker, a gas-solid separator and a fast condenser, wherein, the outlet of the fast thermal cracker is connected to the gas-solid separator, and the outlet of the gas-solid separator is connected to the fast condenser.

The bio-oil oil-water separation system in an embodiment comprises an oil-water separator, the inlet of the oil-water separator is connected to the outlet of the fast condenser, the water-phase end at the outlet of the oil-water separator is connected to a slurry bed low-temperature catalytic hydrogenation reactor, and the oil-phase end at the outlet of the oil-water separator is connected to the oil-phase end at the inlet of a reduction reactor.

The oil-phase bio-oil chemical chain hydrogen production system in an embodiment comprises a reduction reactor, a steam hydrogen generator and an air reactor, the oil-phase end at the inlet of the reduction reactor is connected to the oil-phase end at the outlet of the oil-water separator, the outlet of the reduction reactor is connected to the steam hydrogen generator, the H2 outlet of the steam hydrogen generator is connected to the inlet of the first compressor and the inlet of the second compressor, the low-valence metallic oxide outlet of the steam hydrogen generator is connected to the air reactor, the steam inlet of the steam hydrogen generator is connected to the fractionation and purification system, and the outlet of the air reactor is connected to the inlet of the reduction reactor.

The water-phase bio-oil catalytic hydrogenation system in an embodiment comprises a first compressor, a second compressor, a slurry bed low-temperature catalytic hydrogenation reactor, a slurry bed high-temperature catalytic hydrogenation reactor, a solid-liquid separator and a catalyst reduction unit, the H2 inlet of the slurry bed low-temperature catalytic hydrogenation reactor is connected to the first compressor, the product outlet of the slurry bed low-temperature catalytic hydrogenation reactor is connected to the slurry bed high-temperature catalytic hydrogenation reactor, the H2 inlet of the slurry bed high-temperature catalytic hydrogenation reactor is connected to the second compressor, the solid-liquid product outlet of the slurry bed high-temperature catalytic hydrogenation reactor is connected to the solid-liquid separator, the solid-phase outlet of the solid-liquid separator is connected to the catalyst reduction unit, and the gas-phase outlet of the solid-liquid separator is connected to the fractionation and purification system.

The oxygen-containing liquid fuel fractionation and purification system comprises a fractionation and purification system, its gas-phase inlet is connected to the gas-phase outlet of the solid-liquid separator, and its fractionation and purification product is oxygen-containing liquid fuel.

In an embodiment, the oil-phase bio-oil chemical chain hydrogen production system adopts iron-based oxygen carrier $Fe_2O_3/Al_2O_3$, the carrier is activated aluminum oxide, the active component is $Fe_2O_3$ and the working temperature of the reduction reactor is 900-950° C.; the working temperature of the steam hydrogen generator is 800-850° C.; the working temperature of the air reactor is 950-970° C.

In an embodiment, the working temperature of the slurry bed low-temperature catalytic hydrogenation reactor is 120-160° C. and the working pressure is 3-5 MPa, the working temperature of the slurry bed high-temperature catalytic hydrogenation reactor is 200-300° C. and the working pressure is 8-15 MPa.

The present invention also provides a method for preparing oxygen-containing liquid fuel by catalytic conversion of bio-oil. This method includes the following steps: firstly preparing oil from biomass by thermal cracking, separating the water-phase and oil-phase of the obtained bio-oil, producing hydrogen from the oil-phase bio-oil by a chemical chain method to provide a "hydrogen source" to the water-phase bio-oil to carry out two-step catalytic hydrogenation in a slurry bed and directly separating and purifying hydrogenated product to obtain oxygen-containing liquid fuel.

This method, in an embodiment, includes the following steps: firstly, the biomass raw material is added from the top of the fast thermal cracker, the heat carrier as a heat source of thermal cracking is self-mixed with the biomass and heats the biomass when it flows downwards, and the biomass takes fast thermal cracking reaction after it is heated to 500-600° C.; the outlet of the fast thermal cracker is connected to the gas-solid separator, the solid particles are separated from oil and gas of the thermal cracking product via the gas-solid separator, and pure oil and gas is inputted to the fast condenser, and bio-oil is obtained after fast condensation.

The bio-oil and water obtained from thermal cracking are inputted into the oil-water separator respectively to obtain oil-phase bio-oil and water-phase bio-oil; wherein, hydrogen is produced from the oil-phase bio-oil by a chemical chain method: firstly, the oil-phase bio-oil and high-valence metallic oxide are put into a reduction reactor to take redox reaction at reaction temperature of 900-950° C., and the high-valence metallic oxide is reduced into a high-temperature metallic monomer; the reduction reactor is connected to the steam hydrogen generator, the high-temperature metallic monomer and steam are sent to the steam hydrogen generator respectively and thoroughly mixed and reacted, with a reaction temperature maintained at 800-850° C. to generate hydrogen and low-valence metallic oxide; the steam hydrogen generator is connected to the air reactor; then low-valence metallic oxide and air are sent to the air reactor respectively and thoroughly mixed, and the low-valence metallic oxide takes oxidation reaction with oxygen in the air at a reaction temperature of 950-970° C. to generate high-valence metallic oxide, i.e., oxygen carrier; the air reactor is connected to the reduction reactor, and high-valence metallic oxide is sent to the reduction reactor again for recycling.

The oxygen-containing liquid fuel is prepared from water-phase bio-oil by slurry bed catalytic hydrogenation. Firstly, the hydrogen generated in the steam hydrogen generator is pressurized in the first compressor, and inputted to the slurry bed low-temperature catalytic hydrogenation reactor, meanwhile, water-phase bio-oil and a nickel-based molecular sieve catalyst are added respectively, the reaction temperature is maintained at 120-160° C. and the reaction pressure is 3-5 MPa; after a three-phase low-temperature catalytic hydrogenation reaction, the generated solid-liquid product is sent into the slurry bed high-temperature catalytic hydrogenation reactor, the three phases refer to solid phase—catalyst, liquid phase—water-phase bio-oil and gas phase—hydrogen, then, the hydrogen generated in the steam hydrogen generator is pressurized in the second compressor, and inputted to the slurry bed high-temperature catalytic hydrogenation reactor, meanwhile, nickel-based molecular sieve catalyst is added, the reaction temperature is maintained at 200-300° C. and the reaction pressure is 8-15 MP; after three-phase high-temperature catalytic hydrogenation reaction, the generated solid-liquid product is sent into the solid-liquid separator to separate solid-phase product, i.e., catalyst; then the catalyst is sent into the catalyst reduction unit to remove the carbon deposit on the surface of the catalyst, the regenerated catalyst is again sent into the slurry bed catalytic low-temperature hydrogenation reactor and the slurry bed catalytic high-temperature hydrogenation reactor respectively for recycling, and liquid-phase product is heated and evaporated in the solid-liquid separator to become a gas-phase product.

Lastly, the gas-phase product and cooling water are sent to the fractionation and purification system. Through cooling, fractionation and purification, the gas-phase product is finally converted to the oxygen-containing liquid fuel, while the cooling water becomes steam after heat absorption. The steam is sent to the steam hydrogen generator, as a source of steam for hydrogen production.

Beneficial Effects

The device and method according to the present invention have the following characteristics and advantages:

1. "Staged conversion" of all-components of bio-oil is realized based on the physical and chemical properties of different components (water-phase and oil-phase) of bio-oil by combining chemical chain hydrogen production of the oil-phase bio-oil with catalytic hydrogenation of the water-phase bio-oil.

2. Unlike mainstream technology for preparing bio-oil by biomass (circulating) fluidized bed fast thermal cracking, the fast thermal cracker of the present device adopts self-mixing, down-flow circulating fluidized bed fast thermal cracking technology. As the pyrolysis process does not use fluidized gas, the cost of this process is low. After separation from a semi-coking heat carrier, the pyrolysis gas can be easily condensed. The liquid yield is high.

3. The whole hydrogen production process does not need a catalyst. Instead, an oxygen carrier is used to oxidize oil-phase bio-oil to obtain a high-temperature metallic monomer. The reduced high-temperature metallic monomer contacts steam and takes redox reaction to obtain purer hydrogen. This method fundamentally solves the technical problems of a conventional process of hydrogen production by bio-oil steam catalytic reforming, including catalyst coking and inactivation, complex gas products and difficult hydrogen purification, etc.

4. A slurry bed is used to prepare oxygen-containing liquid fuel (i.e., polyol compound) from water-phase bio-oil. The oxygen-containing liquid fuel is prepared by two-step catalytic hydrogenation under moderate conditions. Compared with conventional stationary-bed bio-oil catalytic hydrogenation technology, low-temperature hydrogenation stabilizes reactions, high-temperature hydrogenation enhances product yield, meanwhile, "solid (catalyst), liquid (water-phase bio-oil) and gas (hydrogen) phases" are "blended and co-processed" in a slurry bed, the three-phase reaction has a large contact area and a long contact time, the efficiency of catalytic hydrogenation will be improved significantly (i.e., high carbon conversion rate and high yield of target product), the reaction conditions of catalytic hydrogenation (such as temperature and pressure) will be effectively reduced and the time of the entire process will be shortened greatly.

5. Considering the poor thermal stability, vulnerability to catalyst coking and inactivation, and other features of oil-phase bio-oil, hydrogen is prepared from oil-phase bio-oil by a chemical chain method to provide a hydrogen source for catalytic hydrogenation of water-phase bio-oil in a slurry bed. This approach on the one hand overcomes the shortcomings of a conventional bio-oil catalytic hydrogenation process which needs an external hydrogen source, and realizes catalytic hydrogenation of bio-oil with a "self-contained hydrogen source" and on the other hand effectively alleviates the problem of the catalyst coking in the subsequent catalytic upgrading process.

BRIEF DESCRIPTION OF THE DRAWINGS

FIG. 1 is a schematic diagram of a method and device for preparing oxygen-containing liquid fuel by catalytic conversion of bio-oil according to the present invention, wherein comprising:

A system for oil preparation by fast thermal cracking of biomass I, a bio-oil oil-water separation system II, an oil-phase bio-oil chemical chain hydrogen production system III, a water-phase bio-oil catalytic hydrogenation system IV and an oxygen-containing liquid fuel fractionation and purification system V.

A fast thermal cracker 1, a gas-solid separator 2, a fast condenser 3, an oil-water separator 4, a reduction reactor 5, a steam hydrogen generator 6, an air reactor 7, a first compressor 8, a second compressor 9, a slurry bed low-temperature catalytic hydrogenation reactor 10, a slurry bed high-temperature catalytic hydrogenation reactor 11, a solid-liquid separator 12, a catalyst reduction unit 13 and a fractionation and purification system 14.

DETAILED DESCRIPTION

Below the present invention will be described by referring to the accompanying drawing.

The present invention provides a method and device for preparing oxygen-containing liquid fuel by catalytic conversion of bio-oil. The method firstly prepares oil from biomass by thermal cracking, separates the water-phase and oil-phase of the obtained bio-oil, produces hydrogen from the oil-phase bio-oil by a chemical chain method to provide a "hydrogen source" for the water-phase bio-oil to carry out two-step catalytic hydrogenation in a slurry bed and directly separates and purifies a hydrogenated product (polyol compound) to obtain oxygen-containing liquid fuel. The device comprises a biomass fast thermal cracker 1, a gas-solid separator 2, a fast condenser 3, an oil-water separator 4, a reduction reactor 5, a steam hydrogen generator 6, an air reactor 7, a first compressor 8, a second compressor 9, a slurry bed low-temperature catalytic hydrogenation reactor 10, a slurry bed high-temperature catalytic hydrogenation reactor 11, a solid-liquid separator 12, a catalyst reduction unit 13 and a fractionation and purification system 14. The combination between chemical chain hydrogen production of oil-phase bio-oil and two-step catalytic hydrogenation of water-phase bio-oil solves the technical problems of a conventional process of hydrogen production by bio-oil steam catalytic reforming, including catalyst coking and inactivation, complex gas products and difficult hydrogen purification and realizes catalytic hydrogenation of bio-oil with a "self-contained hydrogen source" and "staged conversion" of all-components of bio-oil.

The present invention provides a method and device for preparing oxygen-containing liquid fuel by catalytic conversion of bio-oil. The method firstly prepares oil from biomass by thermal cracking, separates the water-phase and oil-phase of the obtained bio-oil, produces hydrogen from the oil-phase bio-oil (components with poor thermal stability and liable to catalyst coking) by a chemical chain method to provide a "hydrogen source" for the water-phase bio-oil to carry out two-step catalytic hydrogenation in a slurry bed, and directly separates and purifies a hydrogenated product (polyol compound) to obtain oxygen-containing liquid fuel. This method includes a system for oil preparation by fast thermal cracking of biomass I, a bio-oil oil-water separation system II, an oil-phase bio-oil chemical chain hydrogen production system II, a water-phase bio-oil catalytic hydrogenation system IV and an oxygen-containing liquid fuel fractionation and purification system V and is realized on a complete set of units including: a fast thermal cracker, a gas-solid separator, a fast condenser, an oil-water separator, a reduction reactor, a steam hydrogen generator, an air reactor, a first compressor, a second compressor, a slurry bed low-temperature catalytic hydrogenation reactor, a slurry bed high-temperature catalytic hydrogenation reactor, a solid-liquid separator, a fractionation and purification system and a catalyst reduction unit, etc.

The system for oil preparation by fast thermal cracking of biomass I comprises a fast thermal cracker, a gas-solid separator and a fast condenser. Biomass raw material undergoes thermal cracking reaction in a fast thermal cracker. Solid particles are removed from the product via a gas-solid separator. After separation, the oil and gas are inputted to a fast condenser and obtain liquid-phase bio-oil after condensation.

The bio-oil oil-water separation system II comprises an oil-water separator. In the separator, bio-oil is mixed with the inputted water. After separation of oil and water phases, oil-phase bio-oil and water-phase bio-oil are formed.

The oil-phase bio-oil chemical chain hydrogen production system III comprises a reduction reactor, a steam hydrogen generator and an air reactor. The oil-phase bio-oil and oxygen carrier (high-valence metallic oxide) take redox reaction in a reduction reactor. After the oxygen carrier is reduced into high-temperature metallic monomer, it is sent into a steam hydrogen generator and takes reaction with the inputted steam to generate hydrogen and low-valence metallic oxide. The latter is sent to an air reactor and takes oxidation reaction with the oxygen in the air to generate high-valence metallic oxide, i.e., oxygen carrier, and then it is sent to the reduction reactor again for recycling.

The water-phase bio-oil catalytic hydrogenation system IV comprises a first compressor, a second compressor, a slurry bed low-temperature catalytic hydrogenation reactor, a slurry bed high-temperature catalytic hydrogenation reactor and a solid-liquid separator. Water-phase bio-oil and hydrogen obtained from the hydrogen production system Ill as well as catalyst are together sent to a slurry bed low-temperature catalytic hydrogenation reactor. After low-temperature catalytic hydrogenation reaction, the generated solid-liquid product is sent to a slurry bed high-temperature catalytic hydrogenation reactor and the gas is discharged. After high-temperature catalytic hydrogenation reaction, the generated solid-liquid product is sent to a solid-liquid separator (evaporator) and the gas is discharged. After separation, the solid-phase product, i.e., catalyst, is sent to a catalyst reduction unit to remove carbon deposited on the surface of the catalyst and to regenerate the catalyst. Then the catalyst is sent to the slurry bed low-temperature catalytic hydrogenation reactor and the slurry bed high-temperature catalytic hydrogenation reactor respectively for recycling. The liquid product is heated in the solid-liquid separator (evaporator) to become a gas phase.

The oxygen-containing liquid fuel fractionation and purification system V, in which the gas-phase product is fractionated and purified, is then cooled with cooling water, and finally is convened into oxygen-containing liquid fuel. Meanwhile, cooling water absorbs heat to become steam and is sent to the steam hydrogen generator.

As shown in FIG. 1, the present invention provides a device for preparing oxygen-containing liquid fuel by catalytic conversion of bio-oil. The device comprises a system for oil preparation by fast thermal cracking of biomass I, for preparing bio-oil.

A bio-oil oil-water separation system II, for receiving the foregoing bio-oil, separating the bio-oil into oil-phase bio-oil and water-phase bio-oil and delivering them to an oil-phase bio-oil chemical chain hydrogen production system III and a water-phase bio-oil catalytic hydrogenation system IV respectively.

An oil-phase bio-oil chemical chain hydrogen production system III, for receiving the foregoing oil-phase bio-oil and producing hydrogen and low-valence metallic oxide, and delivering hydrogen to a water-phase bio-oil catalytic hydrogenation system IV.

A water-phase bio-oil catalytic hydrogenation system IV, for receiving the foregoing water-phase bio-oil and hydrogen and for taking low-temperature catalytic hydrogenation reaction with a catalyst to generate hydrogenated gas-phase product.

An oxygen-containing liquid fuel fractionation and purification system V, for receiving the foregoing gas-phase product and converting it into oxygen-containing liquid fuel. Meanwhile, the cooling water absorbs heat to become steam and is sent to the oil-phase bio-oil chemical chain hydrogen production system III.

The system for oil preparation by fast thermal cracking of biomass I comprises a fast thermal cracker 1, a gas-solid separator 2 and a fast condenser 3, wherein, the outlet of the fast thermal cracker 1 is connected to the gas-solid separator 2, and the outlet of the gas-solid separator 2 is connected to the fast condenser 3.

The bio-oil oil-water separation system II comprises an oil-water separator 4, the inlet of the oil-water separator 4 is connected to the outlet of the fast condenser 3, the water-phase end at the outlet of the oil-water separator 4 is connected to the slurry bed low-temperature catalytic hydrogenation reactor 10, and the oil-phase end at the outlet of the oil-water separator 4 is connected to the oil-phase end at the inlet of the reduction reactor 5.

The oil-phase bio-oil chemical chain hydrogen production system III comprises a reduction reactor 5, a steam hydrogen generator 6 and an air reactor 7, the oil-phase end at the inlet of the reduction reactor 5 is connected to the oil-phase end at the outlet of the oil-water separator 4, the outlet of the reduction reactor 5 is connected to the steam hydrogen generator 6, the H2 outlet of the steam hydrogen generator 6 is connected to the inlet of the first compressor 8 and the inlet of the second compressor 9, the low-valence metallic oxide outlet of the steam hydrogen generator 6 is connected to the air reactor 7, the steam inlet of the steam hydrogen generator 6 is connected to the fractionation and purification system 14, and the outlet of the air reactor 7 is connected to the inlet of the reduction reactor 5.

The water-phase bio-oil catalytic hydrogenation system IV comprises a first compressor 8, a second compressor 9, a slurry bed low-temperature catalytic hydrogenation reactor 10, a slurry bed high-temperature catalytic hydrogenation reactor 11, a solid-liquid separator 12 and a catalyst reduction unit 13, the H2 inlet of the slurry bed low-temperature catalytic hydrogenation reactor 10 is connected to the first compressor 8, the product outlet of the slurry bed low-temperature catalytic hydrogenation reactor 10 is connected to the slurry bed high-temperature catalytic hydrogenation reactor 11, the H2 inlet of the slurry bed high-temperature catalytic hydrogenation reactor 11 is connected to the second compressor 9, the solid-liquid product outlet of the slurry bed high-temperature catalytic hydrogenation reactor 11 is connected to the solid-liquid separator 12, the solid-phase outlet of the solid-liquid separator 12 is connected to the catalyst reduction unit 13, and the gas-phase outlet of the solid-liquid separator 12 is connected to the fractionation and purification system 14.

The oxygen-containing liquid fuel fractionation and purification system V comprises a fractionation and purification system 14, its gas-phase inlet is connected to the gas-phase outlet of the solid-liquid separator 12, and its fractionation and purification product is oxygen-containing liquid fuel.

The oil-phase bio-oil chemical chain hydrogen production system III adopts iron-based oxygen carrier $Fe_2O_3/A_2O_3$, the carrier is activated aluminum oxide, the active component is $Fe_2O_3$ and the working temperature of the reduction reactor 5 is 900-950° C.; the working temperature of the steam hydrogen generator 6 is 800-850° C.; the working temperature of the air reactor 7 is 950-970° C.

The working temperature of the slurry bed low-temperature catalytic hydrogenation reactor 10 is 120-160° and the working pressure is 3-5 MPa, the working temperature of the slurry bed high-temperature catalytic hydrogenation reactor 11 is 200-300° C. and the working pressure is 8-15 MPa.

The present invention also provides a method for preparing oxygen-containing liquid fuel by catalytic conversion of bio-oil. This method includes the following steps: firstly preparing oil from biomass by thermal cracking, separating the water-phase and oil-phase of the obtained bio-oil, producing hydrogen from the oil-phase bio-oil by a chemical chain method to provide a "hydrogen source" to the water-phase bio-oil to carry out two-step catalytic hydrogenation in a slurry bed, and directly separating and purifying hydrogenated product to obtain oxygen-containing liquid fuel.

This method includes the following steps: firstly, the biomass raw material is added from the top of the fast thermal cracker 1, the heat carrier as a heat source of thermal cracking is self-mixed with the biomass and heats the biomass when it flows downwards, and the biomass takes fast thermal cracking reaction after it is heated to 500-600° C.; the outlet of the fast thermal cracker 1 is connected to the gas-solid separator 2, the solid particles are separated from oil and gas of the thermal cracking product via the gas-solid separator 2, and pure oil and gas are inputted to the fast condenser 3, and bio-oil is obtained after fast condensation.

The bio-oil and water obtained from thermal cracking are inputted to the oil-water separator 4 respectively to obtain oil-phase bio-oil and water-phase bio-oil, wherein, hydrogen is produced from the oil-phase bio-oil by a chemical chain method: firstly, the oil-phase bio-oil and high-valence metallic oxide are put into the reduction reactor 5 to take redox reaction at 900-950° C. and the high-valence metallic oxide is reduced into high-temperature metallic monomer; the reduction reactor 5 is connected to the steam hydrogen generator 6, the high-temperature metallic monomer and steam are sent to the steam hydrogen generator 6 respectively and thoroughly mixed and take reaction with reaction temperature maintained at 800-850° C. to generate hydrogen and low-valence metallic oxide; the steam hydrogen generator 6 is connected to the air reactor 7; then low-valence metallic oxide and air are sent to the air reactor 7 respectively and thoroughly mixed, and low-valence metallic oxide takes oxidation reaction with oxygen in the air at reaction temperature 950-970° C. to generate high-valence metallic oxide, i.e., oxygen carrier; the air reactor 7 is connected to the reduction reactor 5, and high-valence metallic oxide is sent to the reduction reactor 5 again for recycling.

Oxygen-containing liquid fuel is prepared from water-phase bio-oil by slurry bed catalytic hydrogenation; firstly, the hydrogen generated in the steam hydrogen generator 6 is pressurized in the first compressor 8, and sent to the slurry bed low-temperature catalytic hydrogenation reactor 10, meanwhile, water-phase bio-oil and nickel-based molecular sieve catalyst are added respectively, the reaction temperature is maintained at 120-160° C. and the reaction pressure is 3-5 MPa; after three-phase low-temperature catalytic hydrogenation reaction, the generated solid-liquid product is sent into the slurry bed high-temperature catalytic hydrogenation reactor 11, the three phases refer to solid phase—catalyst, liquid phase—water-phase bio-oil and gas phase—hydrogen; then, the hydrogen generated in the steam hydrogen generator 6 is pressurized in the second compressor 9, and sent to the slurry bed high-temperature catalytic hydrogenation reactor 11, meanwhile, nickel-based molecular sieve catalyst is added, the reaction temperature is maintained at 200-300° C. and the reaction pressure is 8-15 MP; after three-phase high-temperature catalytic hydrogenation reaction, the generated solid-liquid product is sent into the solid-liquid separator 12 to separate solid-phase product, i.e., catalyst; then the catalyst is sent into the catalyst reduction unit 13 to remove the carbon deposited on the surface of the catalyst, the regenerated catalyst is again sent into the slurry bed catalytic low-temperature hydrogenation reactor 10 and the slurry bed catalytic high-temperature hydrogenation reactor 11 respectively for recycling, and liquid-phase product is heated and evaporated in the solid-liquid separator 12 to become a gas-phase product.

Lastly, the gas-phase product and cooling water are sent to the fractionation and purification system 14 respectively, through cooling, fractionation and purification, the gas-phase product finally is converted to oxygen-containing liquid fuel, while the cooling water becomes steam after heat absorption, and the steam is sent to the steam hydrogen generator, as a source of steam for hydrogen production.

In an embodiment, biomass raw material may comprise straw particles of less than 2 mm. The oxygen carrier adopts iron-based oxygen carrier $Fe_2O_3/Al_2O_3$, with $Al_2O_3$ as a carrier and $Fe_2O_3$ as an active component. The catalyst adopts nickel-based molecular sieve catalyst Ni/HZSM-5. Firstly, straw particles and heat carrier are added from the top of the fast thermal cracker 1, the heat carrier as a heat source of thermal cracking is self-mixed with the biomass and heats the biomass when it flows downwards, and the biomass takes fast thermal cracking reaction after it is heated to 500-600° C.; the outlet of the fast thermal cracker 1 is connected to the gas-solid separator 2, the solid particles are separated from oil and gas of the thermal cracking product via the gas-solid separator 2, and pure oil and gas are inputted to the fast condenser 3, and bio-oil is obtained after fast condensation. The bio-oil and water obtained from thermal cracking are inputted into the oil-water separator 4 respectively to obtain oil-phase bio-oil and water-phase bio-oil. Then the oil-phase bio-oil and water-phase bio-oil are treated separately.

Hydrogen is produced from the oil-phase bio-oil by a chemical chain method. Firstly, the oil-phase bio-oil and high-valence metallic oxide are put into the reduction reactor 5 to take redox reaction with a reaction temperature maintained at about 920° C., and the high-valence metallic oxide is reduced into a high-temperature metallic monomer. The reduction reactor 5 is connected to the steam hydrogen generator 6. Secondly, the high-temperature metallic monomer and steam are sent to the steam hydrogen generator 6 respectively, and thoroughly mixed and reacted, with a reaction temperature maintained at about 830° C. to generate hydrogen and low-valence metallic oxide. The steam hydrogen generator 6 is connected to the air reactor 7. Then the low-valence metallic oxide and air are sent to the air reactor 7 respectively and thoroughly mixed, and the low-valence metallic oxide takes oxidation reaction with oxygen in the air at reaction temperature of about 960° C. to generate a high-valence metallic oxide, i.e., oxygen carrier. The air reactor 7 is connected to the reduction reactor 5. Lastly, high-valence metallic oxide is sent to the reduction reactor 5 again for recycling.

Oxygen-containing liquid fuel is prepared from water-phase bio-oil by slurry bed catalytic hydrogenation. Firstly, the hydrogen generated in the steam hydrogen generator 6 is pressurized in the first compressor 8, and sent to the slurry bed low-temperature catalytic hydrogenation reactor 10. Meanwhile, water-phase bio-oil and a nickel-based molecular sieve catalyst are added respectively. The reaction temperature is maintained at about 125° C. and the reaction pressure is about 5 MPa. After three-phase (solid phase: catalyst; liquid phase: water-phase bio-oil; gas phase: hydrogen) low-temperature catalytic hydrogenation reaction, the generated solid-liquid product is sent into the slurry bed high-temperature catalytic hydrogenation reactor 11. Then, the hydrogen generated in the steam hydrogen generator 6 is pressurized in the second compressor 9, and sent to the slurry bed high-temperature catalytic hydrogenation reactor 11. Meanwhile, a nickel-based molecular sieve catalyst is added. The reaction temperature is maintained at about 225° C. and the reaction pressure is about 10 MP. After three-phase high-temperature catalytic hydrogenation reaction, the generated solid-liquid product is sent into the solid-liquid separator (evaporator) 12 to separate the solid-phase product, i.e., catalyst. Then the catalyst is sent into the catalyst reduction unit 13 to remove the carbon deposit on the surface of the catalyst. The regenerated catalyst is again sent into the slurry bed catalytic low-temperature hydrogenation reactor 10 and the slurry bed catalytic high-temperature hydrogenation reactor 11, respectively, for recycling. Liquid-phase product is heated and evaporated in the solid-liquid separator (evaporator) 12 to become a gas-phase product.

Lastly, the gas-phase product and cooling water are sent to the fractionation and purification system 14 respectively. Through cooling, fractionation and purification, the gas-phase product finally is converted to oxygen-containing liquid fuel, while the cooling water becomes steam after heat absorption. The steam is sent to the steam hydrogen generator, as a source of steam for hydrogen production.

The above description is only one embodiment of the present invention. The protection scope of the present invention is not limited to the above embodiment. All the equivalent modifications or changes made by a person skilled in the art based on the content disclosed by the present invention shall be included in the protection scope recorded in claims.

The invention claimed is:

1. A method for preparing oxygen-containing liquid fuel by catalytic conversion of bio-oil, comprising the following steps:
   thermally cracking biomass to produce bio-oil, wherein the bio-oil includes water-phase bio-oil and oil-phase bio-oil;
   separating the water-phase bio-oil from the oil-phase bio-oil;
   producing hydrogen from the oil-phase bio-oil by a chemical-chain method;
   providing the hydrogen produced from the oil-phase bio-oil as a hydrogen source to the water-phase bio-oil;
   carrying out a two-step catalytic hydrogenation of the water-phase bio-oil to produce a hydrogenated product, wherein the two-step catalytic hydrogenation comprises (i) a first step which takes place in a first slurry bed catalytic hydrogenation reactor maintained at a temperature of 120-160° C. and a pressure of 3-5 MPa and (ii) a second step which takes lace in a second slurry bed catalytic hydrogenation reactor maintained at a temperature of 200-300° C. and a pressure of 8-15 MPa, and wherein the first step and the second step take place in different slurry beds; and
   purifying the hydrogenated product to obtain oxygen-containing liquid fuel.

2. The method of claim 1, wherein the step of thermally cracking biomass to produce bio-oil further comprises:
   adding biomass raw material to a thermal cracker;
   mixing a heat carrier with the biomass raw material to obtain a mixture, wherein the mixture flows downwards and undergoes a thermal cracking reaction at a temperature of 500-600° C. to produce a thermal cracking product comprising gas, oil and solid particles;
   passing the thermal cracking product through an outlet of the thermal cracker to a gas-solid separator, wherein the solid particles are separated from the oil and gas of the thermal cracking product; and
   passing the oil and the gas of the thermal cracking product to a condenser, wherein the bio-oil is obtained upon condensation.

3. The method of claim 1, wherein the step of separating the water-phase bio-oil from the oil-phase bio-oil further comprises passing the bio-oil to an oil-water separator to obtain the oil-phase bio-oil and the water-phase bio-oil.

4. The method of claim 1, wherein the step of producing hydrogen from the oil-phase bio-oil by the chemical chain method further comprises:
   passing the oil-phase bio-oil to a reduction reactor containing a first metal oxide, wherein the oil-phase bio-oil and the first metal oxide undergo a redox reaction at 900-950° C. to produce a metallic monomer;
   passing the metallic monomer and steam to a steam hydrogen generator and reacting the metallic monomer and steam at 800-850° C. to generate hydrogen and a second metal oxide, wherein an oxidation state of the metal in the second metal oxide is less than that of the metal in the first metal oxide;
   mixing the second metal oxide with air;
   passing the mixture of the second metal oxide and the air to an air reactor wherein the second metal oxide reacts with oxygen in the air at a temperature of 950-970° C. to produce the first metal oxide; and
   recycling the first metal oxide to the reduction reactor.

5. The method of claim 1, wherein the step of carrying out the two-step catalytic hydrogenation of the water-phase bio-oil further comprises:
compressing a first portion of the hydrogen produced by the chemical-chain method in a first compressor, wherein the chemical chain method comprises producing hydrogen from the oil-phase bio-oil in a steam hydrogen generator;
sending the compressed first portion of the hydrogen, the water-phase bio-oil, and a first nickel-based molecular sieve catalyst to the first slurry bed catalytic hydrogenation reactor to produce a first solid-liquid product;
compressing a second portion of the hydrogen produced by the chemical-chain method in a second compressor;
sending the compressed second portion of the hydrogen, the first solid-liquid product, and a second nickel-based molecular sieve catalyst to the second slurry bed catalytic hydrogenation reactor to produce a second solid-liquid product;
sending the second solid-liquid product to a solid-liquid separator to separate out a solid-phase catalyst product from a liquid-phase product;
passing the solid-phase catalyst product to a catalyst reduction unit to remove carbon deposited on a surface of the solid-phase catalyst product to form a regenerated catalyst;
recycling a first portion of the regenerated catalyst to the first slurry bed catalytic hydrogenation reactor;
recycling a second portion of the regenerated catalyst to the second slurry bed catalytic hydrogenation reactor; and
heating and evaporating the liquid-phase product in the solid-liquid separator to produce a gas-phase product.

6. The method of claim 5, wherein the step of purifying the hydrogenated product to obtain the oxygen-containing liquid fuel further comprises:
passing the gas-phase product and cooling water to a fractionation and purification system to convert the gas-phase product to the oxygen-containing liquid fuel and to convert the cooling water to steam; and
sending the steam to the steam hydrogen generator.

* * * * *